(12) United States Patent
Teng

(10) Patent No.: US 8,242,675 B2
(45) Date of Patent: Aug. 14, 2012

(54) DISPLAY DEVICE

(75) Inventor: Yin-Hsiang Teng, Yangmei Township, Taoyuan County (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 0 days.

(21) Appl. No.: 13/028,280

(22) Filed: Feb. 16, 2011

(65) Prior Publication Data

US 2012/0019121 A1   Jan. 26, 2012

(30) Foreign Application Priority Data

Jul. 20, 2010   (TW) ............................... 99123881 A

(51) Int. Cl.
*H01J 21/10* (2006.01)
*H01J 5/62* (2006.01)
(52) U.S. Cl. ......... 313/306; 313/495; 313/505; 313/332
(58) Field of Classification Search ........................ None
See application file for complete search history.

(56) References Cited

U.S. PATENT DOCUMENTS 7,345,415 B2 * 3/2008 Chen et al. ..................... 313/495
7,570,072 B2 * 8/2009 Hata et al. ................ 324/760.01

* cited by examiner

*Primary Examiner* — Ashok Patel
(74) *Attorney, Agent, or Firm* — Ming Chow; Sinorica, LLC

(57) ABSTRACT

The present invention discloses a peripheral line scheme of a display device. The routing of the peripheral lines is designed with a grating configuration to electrically connect to a driver IC or an integrated circuit. When the repair line is employed, a part of the peripheral lines could be separated by a laser optionally, and it subsequently could be welded to the repair line by the laser to improve the ability of the repair line. The display device of the present invention includes a display panel with a plurality of signal lines including the data lines and the scan lines. At least one integrated circuit is electrically connected to the plurality of signal lines to drive the display panel for displaying, and at least one repair line is electrically connected to the integrated circuit. At least one peripheral line is electrically connected to the integrated circuit in the grating configuration and in parallel to the repair lines.

6 Claims, 7 Drawing Sheets

DISPLAY DEVICE

FIELD OF THE INVENTION

The present invention is generally related a display device, and more particularly to a scheme of a peripheral line and repair line of the display device to reduce used area of the non-display region of the display device and to improve the testability and usability of the repair line.

BACKGROUND OF THE INVENTION

With rapid developments of the internet and wireless communication technology, the informatization is gradually popularized to individuals, therefore, various portable information products, such as notebook computers, mobile phones, digital cameras and personal digital assistants, are developed rapidly. In recent years, due to the development tendency of the display device towards thin, lightweight, low power consumption and non-radioactive pollution. It gradually extends to the refined monitors or portable information products from the application of an early display product with low information capacity, and it consequently replaces the traditional cathode ray tube (CRT) display.

For example, the structure of the liquid crystal device includes a thin-film transistor (TFT) substrate, a color filter (CF) substrate and a liquid crystal layer configured between the two substrates. With reference to FIG. 1, it shows a scheme of a conventional display device 10. The display device 10 includes a display region 14 which is configured by a plurality of parallel data lines D1~Dm and a plurality of parallel scan lines S1~Sn. The data lines D1~Dm and the scan lines S1~Sn are interlaced with one another. Pixel driving circuits 16 constructed by a thin-film transistor and a capacitance are formed at each intersection of the data lines D1~Dm and the scan lines S1~Sn. The pixel driving circuits 16 could receive the image data signals transferred from the data lines D1~Dm and the switching/addressing signals transferred from the scan lines S1~Sn to control the operation of corresponding pixels.

The conventional display device 10 is usually configured by a plurality of driver ICs (Driver IC) 20, for instance, the driver ICs 20 of the display device 10 are utilized to output required voltage to the pixel to cause the pixel generate different color level. The data lines D1~Dm could couple to the printed wiring board (PWB) (not shown) by the driver ICs 20. The driver ICs 20 could be classified into a tape carrier package (TCP), a chip on film (COF) and a chip on glass (COG) based on various processes, in where the tape carrier package and the chip on film are the majority in the industry. In addition to the connection with the plurality of the data lines D1~Dm or the scan lines S1~Sn, the driver ICs 20 also connect to at least one peripheral line 22 and at least one repair line 24 which acts as a replacement for the data lines D1~Dm when short circuit occurred.

Generally, in order to prevent the data lines or scan lines from being short circuit to cause the signal transmission failure, typically, the repair line is configured in the peripheral area of the display panel of the display device to act a substitute for the data line or scan line which is short circuit during the manufacturing process of the display device. When the short circuit of the data line or the scan line occurred, the image data signals or the switching/addressing signals transmitted from external could be still transmitted to the display panel successfully through the repair lines to control the operating of the pixel and to prevent the display panel from being failure. Under normal circumstances, the repair lines are electrically disconnected to the data lines or the scan lines.

Please refer to FIG. 2, it illustrates the connection configuration between the peripheral line 22, repair line 24 and the driver ICs 20 according to the prior art. In the conventional configuration, the peripheral line 22 (such as Vcom) and the repair line 24 are jointly connected to the driver ICs 20. However, the configuration consumes much space and it requires predetermining the design of the repair lines 24 for ensuring they have the ability to replace the data lines D1~Dm or the scan lines S1~Sn. Thus, the excessive space is generally reserved in advance for the increased number of the repair lines or the increased diameter of the repair lines, both of which may reduce the resistance of the repair lines and enhance the ability to transmit signals.

In recent year, however, the development of various portable information products continually towards to the tread of thinner and lighter weight, such as a tablet computer. Therefore, what is a current important issue is to develop a configuration of display device with reduced consumed area of the non-display region.

SUMMARY OF THE INVENTION

Based on the shortcomings set forth, the present invention provides a peripheral line scheme of the display device to reduce the consumed area of the non-display region and improve the testability and the usability of the repair lines.

One object of the present invention is to effectively enhance the testability and the usability of the repair lines of the display device to reduce the cost and improve the image quality by virtue of the configuration of the peripheral lines of the display device.

Another object of the present invention is to increase the design tolerance of the repair line and the ability of the repair line could be adjusted optionally in the testing phase to raise the yield rate of an output of the display device.

In order to achieve aforementioned object, the present invention discloses a peripheral line scheme of a display device. The routing of the peripheral lines is designed with a grating arrangement and is electrically connected to a driver IC or an integrated circuit. When the repair line is employed, the peripheral lines could be separated by a laser optionally, and subsequently, it could be welded to the repair line by the laser to improve the repair ability.

The display device of the present invention includes a display panel with a plurality of signal lines including data lines and scan lines; at least one integrated circuit is electrically connected to the plural signal lines to drive the display panel; at least one repair line is electrically connected to the integrated circuit; and at least one peripheral line is electrically connected to the integrated circuit in a grating configuration and in parallel to the repair line. The present invention further includes a flexible printed circuit board configured at an edge of the display panel and electrically connected to the plural signal lines, and the integrated circuit is configured on the flexible printed circuit board. The integrated circuit may be a scan drive circuit which is electrically connected to the scan lines of the plural signal lines or a data drive circuit which is electrically connected to the data lines of the signal lines.

Wherein, the repair lines and the peripheral lines are further made of different metals to reduce the interactive interference between the repair lines and the peripheral lines. The repair lines are parallel to the repair lines and the length of the repair lines is longer than or equal to the length of the peripheral lines and overlaps are formed between the repair lines and the peripheral lines. A part of the peripheral lines is welded with the repair lines at the overlaps by the laser when the repair line is employed to reduce the signal decay of the repair line and to raise the image quality.

An embodiment of the present invention provides a repair line which is shorter than the peripheral line. One end of the repair line is electrically connected to the integrated circuit and the other end is overlapped with the peripheral line. When the repair line is employed, a part of the peripheral lines is welded with the repair line at the overlap by the laser and the peripheral line is electrically connected to the repair lines. Successively, a part of the peripheral lines is separated from the peripheral lines by the laser. Thus, during the process of the display device, the length of the repair line is equal to the distance between the integrate circuit and the peripheral line.

One of the advantages of the present invention is that the peripheral lines of the display device are electrically connected to the ICs in a grating configuration. The peripheral lines could be optionally welded to the repair lines to improve the testability and usability of the repair lines of the display device and reduce the signal decay of the repair lines to enhance the image quality.

Another advantage of the present invention is that the ability of transmitted signal of the repair line could be adjusted in the test phase according to the various processes to enhance the yield rate of the output to achieve the purposes of cost down.

Further merits given in the following embodiments and with reference to the accompanying drawings and claims will become apparent clearly to the reader.

DETAILED DESCRIPTION OF THE PREFERRED EMBODIMENT

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described.

The present invention and embodiments now are described in detail. In diagrams and descriptions shown as below, the same symbols are utilized to represent the same or similar elements. The main features of the embodiments of the present invention are described in highly simplified illustration. Furthermore, the drawings of the present invention do not depict every characteristic of the actuality embodiments, and all elements of the drawings are not depicted in proportional size but in relative size.

The present invention discloses the display device, and more particularly to the peripheral line and the repair line scheme of the display device which may reduce the consumed area of the non-display region and improve the testability and usability of the repair line by the grating configuration design of the peripheral lines for electrically connecting to the driver IC or an integrated circuit. When the repair lines are utilized, a part of the peripheral lines could be separated from the repair lines by laser, optionally. It is welded to the repair lines by the laser to improve the ability of the repair lines.

Figure 1:
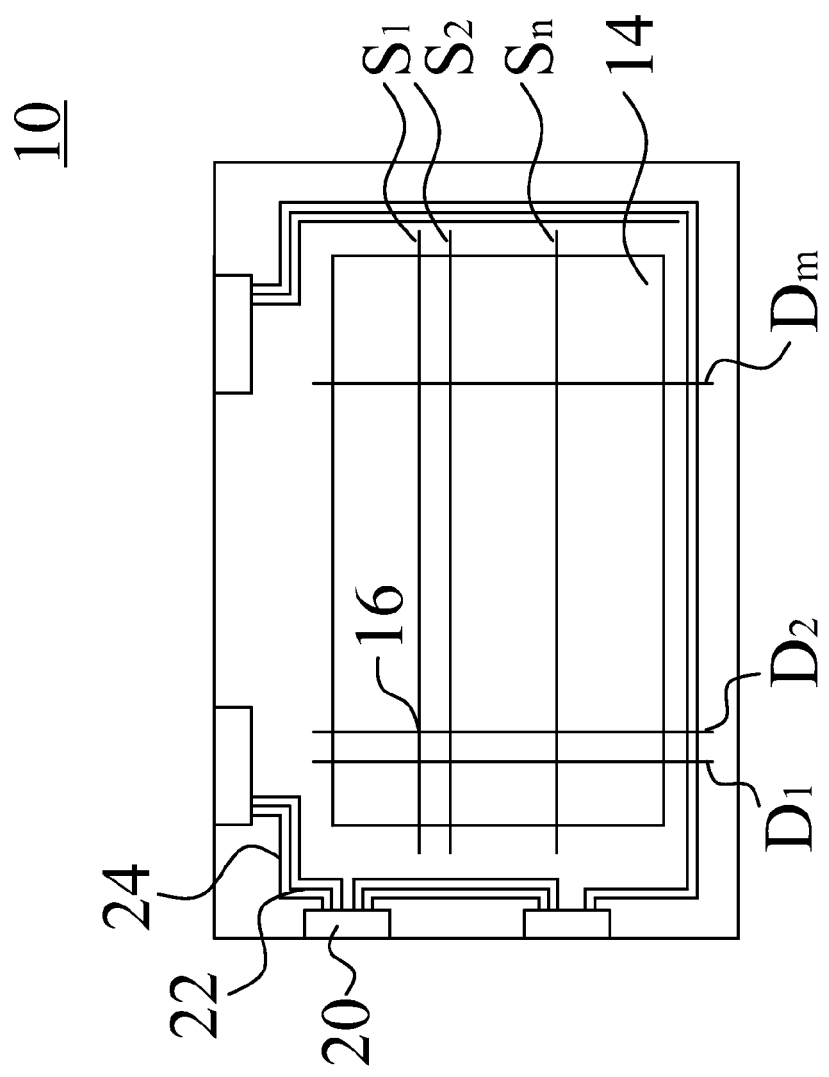
FIG. 1 shows a scheme of the display device.
Figure 2:
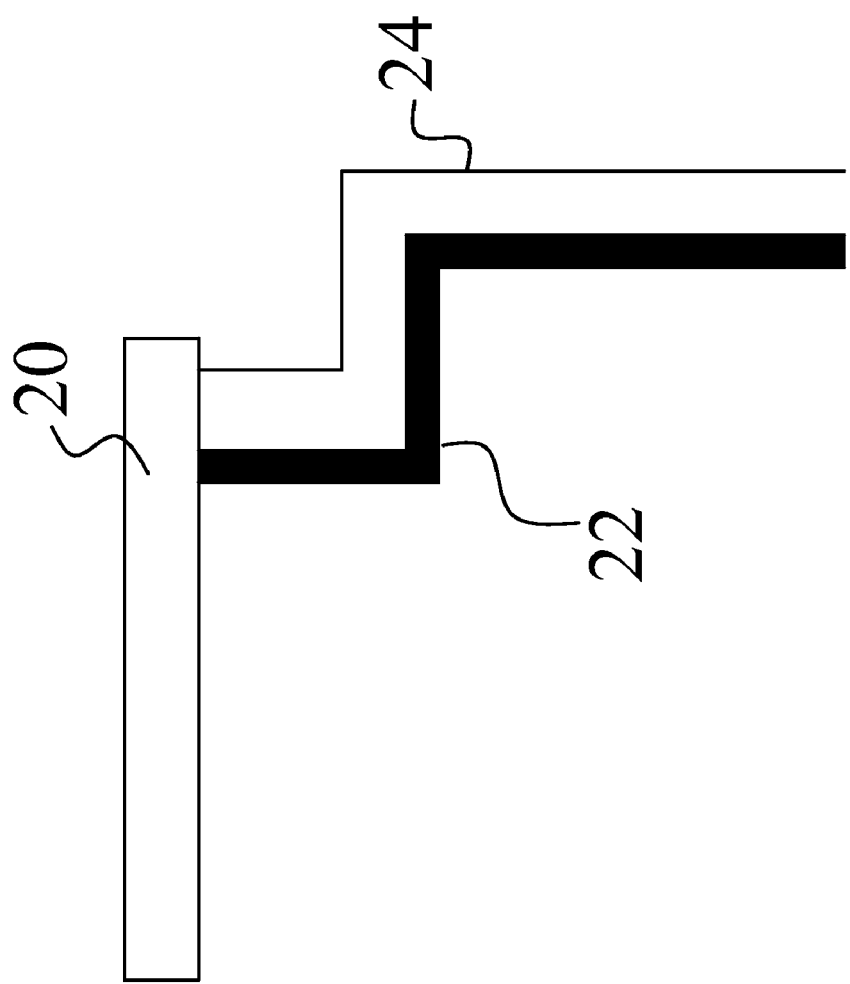
FIG. 2 shows a diagram of the conventional configuration of the peripheral line and the repair line which are connected to the driver integrated circuit.
Figure 3:
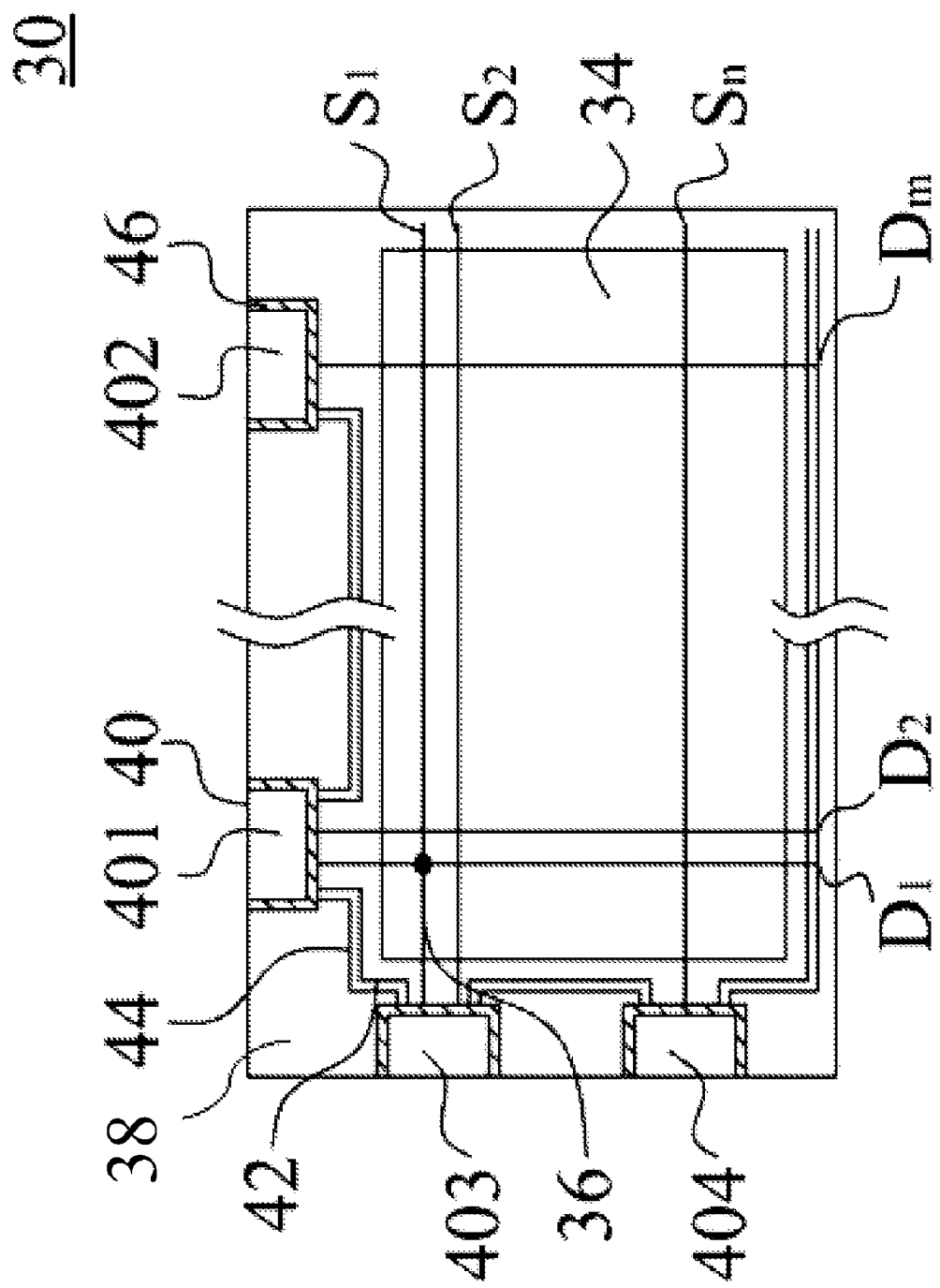
FIG. 3 shows a scheme of the display device in accordance with the present invention.

FIG. 3 shows a diagram of the display device 30 in accordance with the present invention. The display device 30 of the present invention includes a display panel 34 with a plurality of signal lines D1~Dm, S1~Sn including data lines D1~Dm and scan lines S1~Sn; at least one integrated circuit 40 is electrically connected to the signal lines S1~Sn, D1~Dm to drive the display panel 34 for displaying; at least one repair line 44 is electrically connected to the integrated circuit 40 by one end; and at least one peripheral line 42 is electrically connected to the integrated circuit 40 in the grating configuration and the peripheral line 42 is parallel to the repair line 44 in the non-display region 38 of the display device 30, and that is the area outside of display panel 34 not for image display.

In the embodiment of the present invention, the display device 30 is similar to a common display device structure, which includes a thin-film transistor substrate, a color filter substrate and a liquid layer configured between the two substrates. It should be recognized that the structure of the display device described herein is provided for illustration, but not to limit the scope of the present invention. It is because that aforementioned structure is not the principal technical characteristic of the present invention, the illustration is therefore omitted to avoid obscurity.

In the embodiment of the present invention, the display panel 34 is configured with a plurality of signal lines which includes the data lines D1~Dm and the scan lines S1~Sn, and the data lines D1~Dm and the scan lines S1~Sn are interlaced with one another. A pixel driving circuit 36 formed by electronic components, for instance, a thin-film transistor and a capacitance, is located at each intersection of the data lines D1~Dm and the scan lines S1~Sn.

In the embodiment of the present invention, the integrated circuit 40 is configured on the display panel 34 by the chip-on-film package. The integrated circuit 40 is electrically connected to the signal lines S1~Sn, D1~Dm to drive the display panel 34 for displaying. The integrated circuit 40 could be a scan drive circuit which is electrically connected to the scan lines S1~Sn of the signal lines or it could be a data drive circuit which is electrically connected to the data lines D1~Dm of the signal lines. Two data drive circuits 401~402 and two scan drive circuits 403~404 are shown in the figures in order to illustrate the embodiments of the present invention. In another embodiment of the present invention, it further includes at least one flexible printed circuit board 46 configured at the edge of the display panel 34. The flexible printed circuit board 46 is electrically connected to the signal lines S1~Sn~D1~Dm and the integrated circuit 40 is configured on the flexible printed circuit board 46. The embodiment with the flexible printed circuit board 46 is different from others by the package type and the configuration of the integrated circuit. Therefore, the integrate circuit of the present invention is not limited to the package type or configuration of the integrate circuit 40. Alternatively, it also could be mounted on the display panel 34 by the tape carrier package and the chip on glass type.

Figure 4:
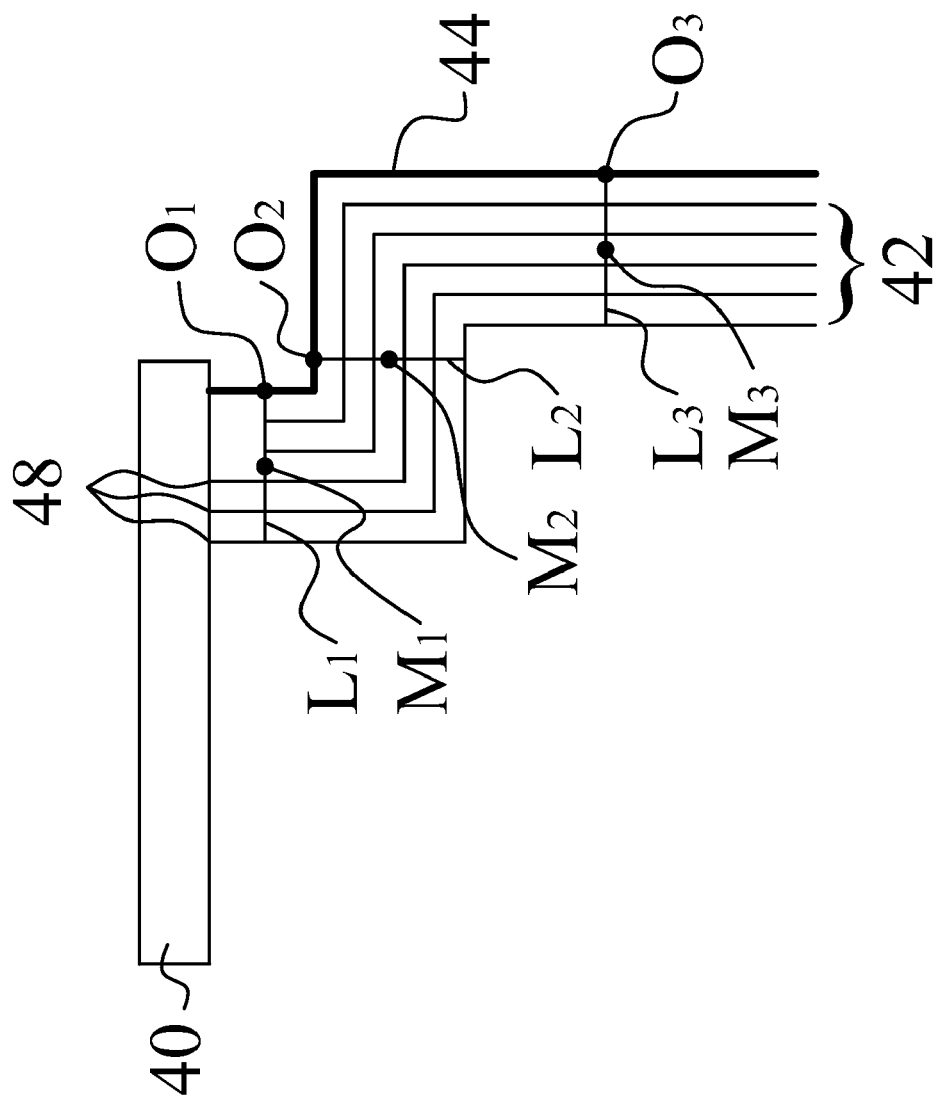
FIG. 4 shows a diagram of the configuration of the peripheral lines and the repair line which are connected to the integrated circuit in accordance with one embodiment of the present invention.

FIG. 4 shows a diagram in accordance with one embodiment of the present invention. In the configuration, the peripheral lines 42 and the repair line 44 are connected to the integrated circuit 40 In this embodiment, one end of the repair line 44 is electrically connected to the integrated circuit 40 to act as a substitute line of the data lines D1~Dm when short circuit occurred. The peripheral lines 42 are electrically connected to the integrated circuit 40 in parallel. The peripheral lines 42 are connected in parallel by a plurality of connecting wires L1~L3, and connected to the integrate circuit 40 through at least one connecting point 48. The major function of the peripheral line 42 is to connect the integrated circuit 40 to drive the signals of the display panel 34. It should be noted that the display device 30 of the present invention generally includes at least one peripheral line 42 and the function of each line is different. In one embodiment, the peripheral line 42 of the present invention refers to the lines which are closest to the inside of the repair line 44, and they are usually but not limited to the Vcom lines. In another embodiment, the peripheral line 42 of the present invention refers to the lines which are closest to the outside of the repair line 44.

In this embodiment, the repair line 44 is arranged in parallel to the peripheral line 42 and the length of the repair lines is longer than or equal to the length of the peripheral line. The part of the peripheral line 42 could connected by overlaps O1~O3 formed between the repair lines 44 and the connecting wires L1~L3.

Figure 5:
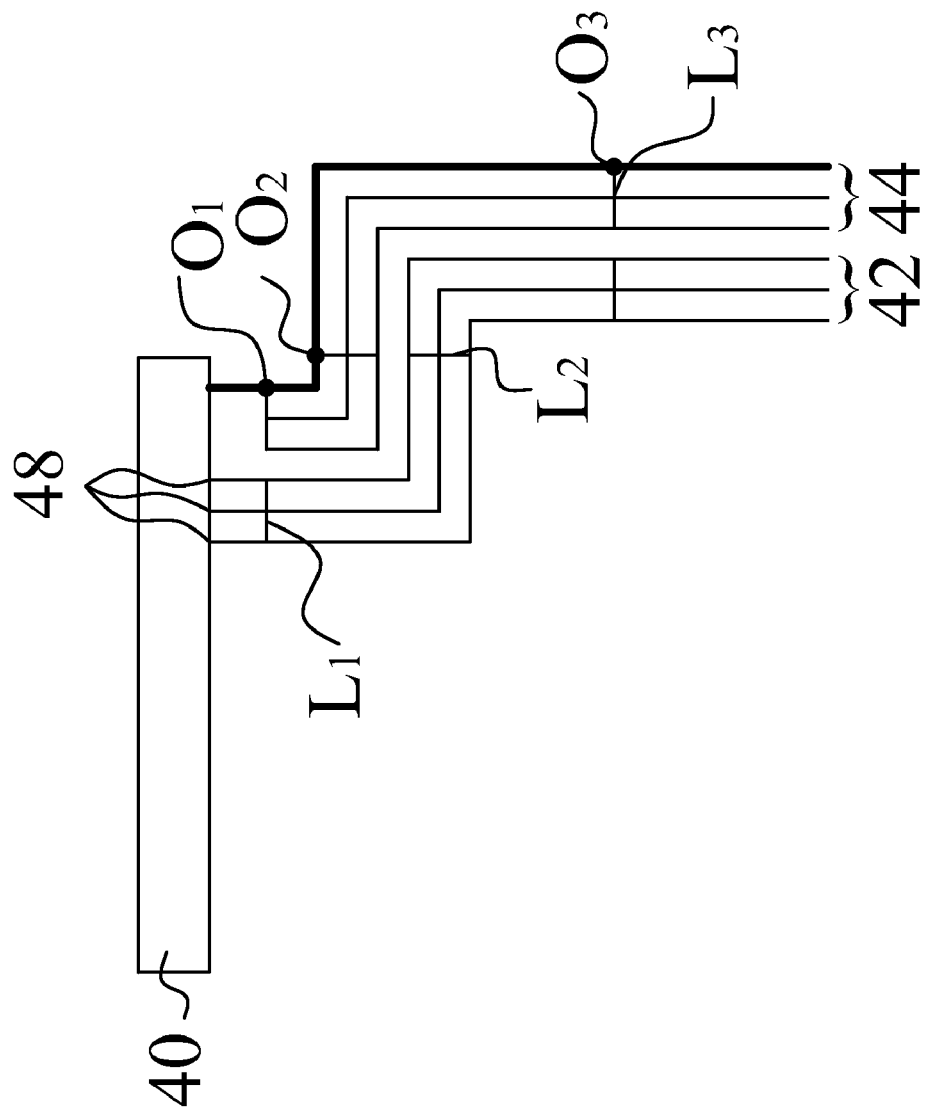
FIG. 5 shows a diagram of the configuration of the laser-separated repair lines in accordance with one embodiment of the present invention.

In general, the repair line 44 is not active when the repair line 44 is standby and the repair line 44 is floating. When the repair lines 44 are used, the connecting wires of the peripheral lines 42 and the repair line 44 could be welded at the overlaps O1~O3 by the laser, and the redundancy peripheral lines 42 are subsequently separated by the laser so as to make a part of the peripheral lines 42 act as a part of the repair line 44. FIG. 5 illustrates the configuration of the laser-separated repair lines 44 in accordance with the present invention. When the repair line 44 is employed, the repair lines 44 are welded at the overlaps O1~O3 by the laser. Then, the redundancy peripheral lines 42 are separated at the cutting point M1~M3 by the laser (shown in FIG. 4). The cutting point M1~M3 on the connecting wires L1~L3 may be located at any position of any two peripheral lines 42. Generally, the peripheral lines 42 could be utilized to act as the repair lines 44 to improve the repair ability of the repair lines 44, decrease the signal decay of the repair lines 44 and enhance the image quality due to the peripheral lines 42 are designed with sufficient tolerance. Especially, when the process is not uniformity, the present invention offers the opportunity to alter the repair ability of the repair line 44 optionally. In addition, in an embodiment of the present invention, the repair line 44 and the peripheral line 42 are made of different metals to reduce the interactive interference between the repair lines 44 and the peripheral lines 42.

Figure 6:
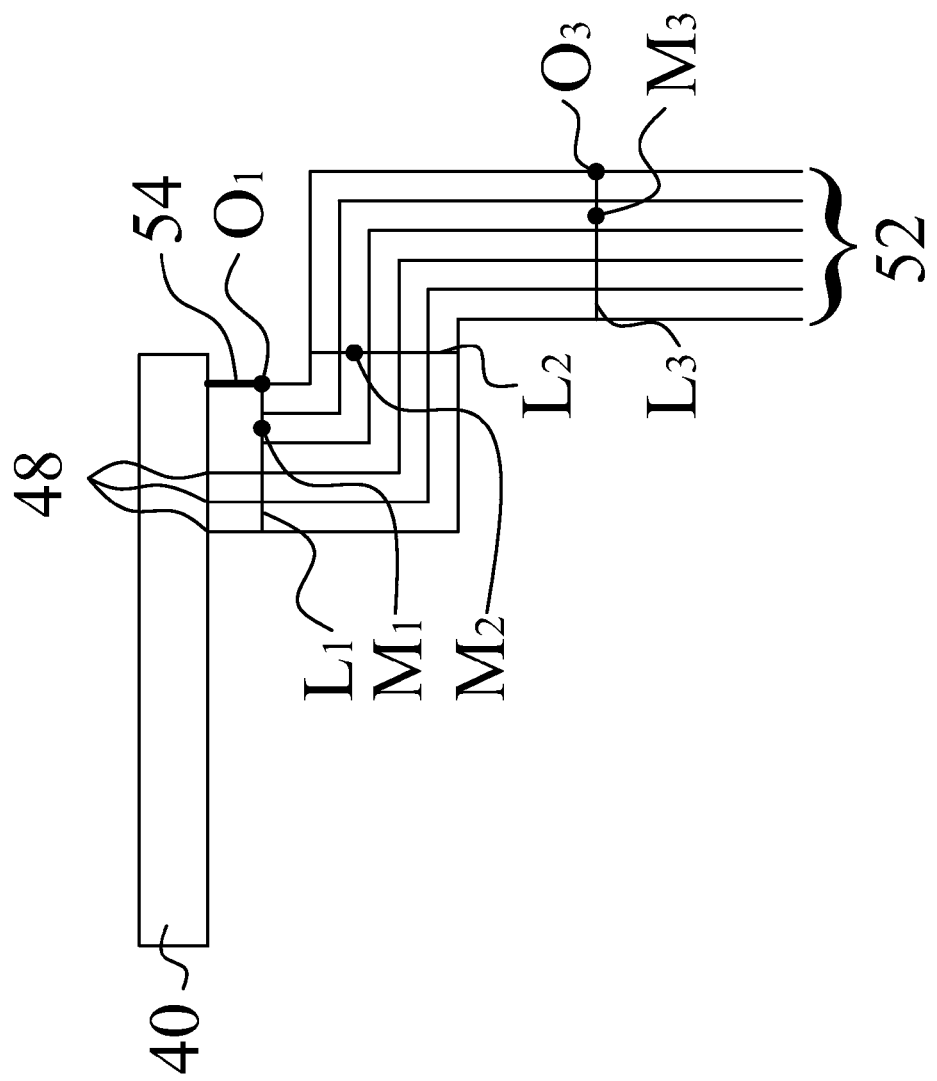
FIG. 6 shows a diagram of the configuration of the peripheral lines and the repair line which are connected to the integrated circuit in accordance with another embodiment of the present invention.

FIG. 6 illustrates further embodiment of the present invention. In the configuration, the peripheral lines 52 and the repair line 54 are connected to the integrated circuit 40. In this embodiment, one end of the repair line 54 is electrically connected to the integrate circuit 40 to play the role of substitute of the data lines D1~Dm when the short circuits occurs. The peripheral line 52 is electrically connected to the integrated circuit 40 in parallel configuration. The peripheral line 52 is connected in parallel by a plurality of connecting wires L1~L3, and connected to the integrate circuit 40 at the at least one connecting point 48. The major function of the peripheral line 52 is to provide the connection for the integrated circuit 40 to drive the signals of the display panel 34. It should be recognized that the display device of the present invention generally includes at least one peripheral line 52, the function of each line is different. In one embodiment, the peripheral line 52 of the present invention refers to the lines which are closest to the repair line 54 and they are usually but no limited the Vcom lines.

In this embodiment, the repair line 54 is parallel to the peripheral line 52 and the length of the repair lines 54 is shorter than the length of the peripheral line 52. The end of the repair line 54 is electrically connected to the integrate circuit 40 and the other end of the repair line 54 is overlapped with the peripheral line 52 at the location which is indicated by an overlap O1. As shown in figure, the length of the repair line 54 could be the distance between the peripheral line 52 and the integrate circuit 40. The repair line 54 is not active when the repair line 54 is standby, the repair line 54 is floating. When the repair line 54 is used, the repair line 54 could be welded to the peripheral lines 52 at the overlap O1 by the laser and the repair line 54 is subsequently and electrically connected to the peripheral lines 52. Successively, the unnecessary peripheral lines 52 are separated by the laser to ensure that a part of peripheral lines 52 acts as a part of repair line 54.

Figure 7:
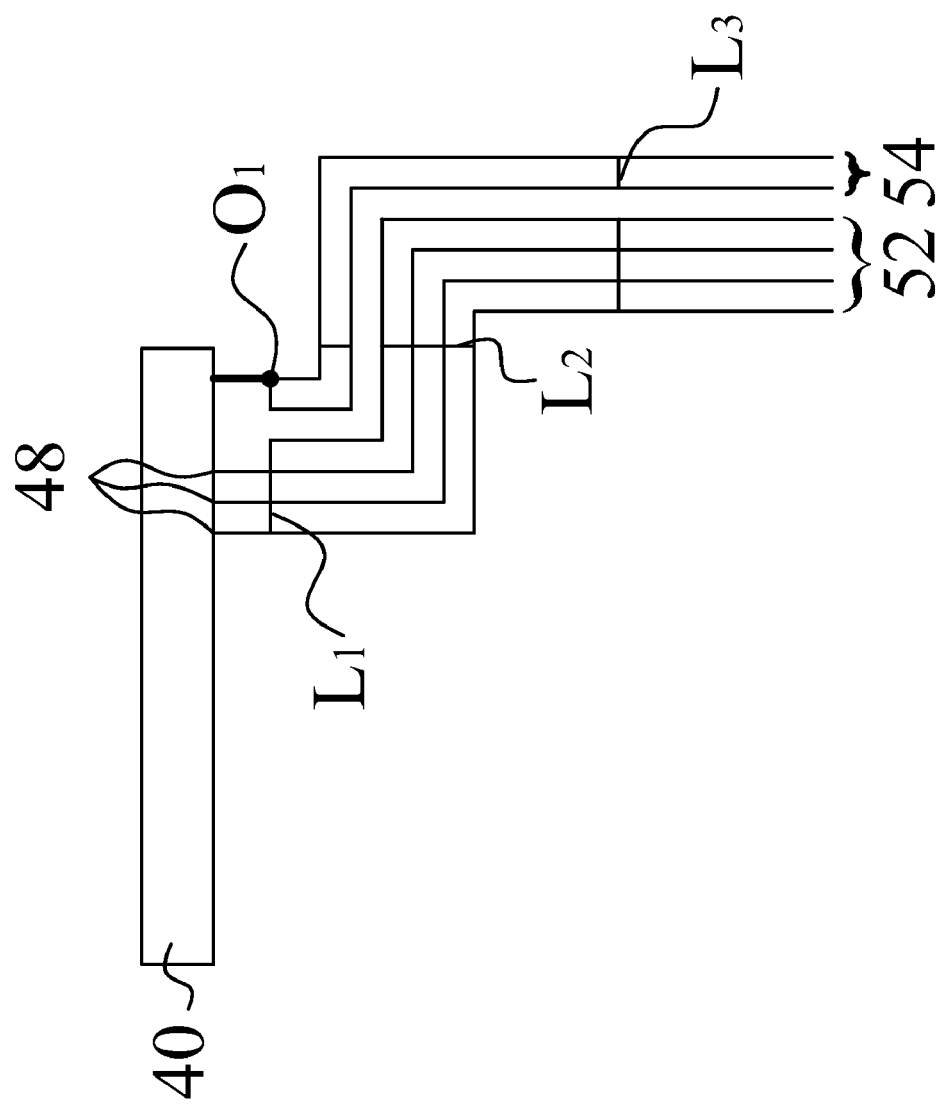
FIG. 7 shows a diagram of the configuration of the laser-separated repair lines in accordance with another embodiment of the present invention.

FIG. 7 illustrates the configuration of the laser-separated repair line 54 in accordance with another embodiment of the present invention. When the repair line 54 is utilized, the repair line 54 and the peripheral lines are welded at the overlap O1 by the laser. Then, the unnecessary peripheral lines 52 is separated at the cutting point M1~M3 by laser (shown in FIG. 6). The cutting point M1~M3 on the connecting wires L1~L3 may be located at any position of any two of the peripheral lines 52. Generally, it is because that the peripheral lines 52 are designed with sufficient tolerate, a part of the peripheral lines 52 could be act as the repair lines 54 to improve the repair ability of the repair lines 54, decrease the signal decay of the repair lines 54 and enhance image quality. Especially, when the process is not uniformity, the repair ability of the repair line 54 could be adjusted optionally by the present invention. In addition to the present invention embodiment, the repair line 54 and the peripheral line 52 are made of different metals to reduce the interactive interference of the repair lines 54 and the peripheral lines 52.

In embodiment of the present invention, the display device includes various types display panel, such as liquid crystal display (LCD), plasma display panel (PDP), organic light-emitting diode (OLED), electrochromic display (ECD), electro-phoretic display (EPD), field emission display (FED) and surface-conduction electron-emitter display (SED) and so on.

The present invention provides an electrical connection to the integrate circuit by virtue of the routing of the peripheral lines with the grating configuration. The peripheral lines could be selectively welded to the repair lines to increase the testability and usability of the repair lines, thereby reducing the signals decay of the repair lines to enhance the image quality. Further, the ability of transmitted signals of the repair line could be adjusted in the testing phase for compensating the process non-uniformity. The yield rate of the display device is effectively enhanced to achieve the purposes of cost down.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A display device comprising:
   a display panel with a plurality of signal lines;
   at least one integrated circuit electrically connected to the plurality of signal lines to drive the display panel;
   at least one repair line electrically connected to the integrated circuit; and
   at least one peripheral line electrically connected to the integrated circuit in a grating configuration and in parallel to the repair line,
   wherein the length of the repair line is longer than or equal to the length of the peripheral line, and the repair line has a plurality of overlaps formed by a plurality of connecting wires and the peripheral line.

2. A display device as claim 1, wherein part of the peripheral line is welded at the overlaps formed by a plurality of connecting wires and the peripheral line by a laser.

3. A display device as claim 2, wherein the part of the peripheral line is separated from the peripheral line by the laser so as to make the part of the peripheral line act as a part of the repair line.

4. A display device, comprising:
   a display panel with a plurality of signal lines;
   at least one integrated circuit electrically connected to the plurality of signal lines to drive the display panel;
   at least one repair line electrically connected to the integrated circuit; and
   at least one peripheral line electrically connected to the integrated circuit in a grating configuration and in parallel to the repair line,
   wherein the repair line is shorter than the peripheral line and an overlap is formed between one end of the repair line and the peripheral line.

5. A display device as claim 4, wherein the part of the peripheral line is welded with the repair line at the overlap by a laser.

6. A display device as claim 5, wherein the part of the peripheral line is separated from the peripheral line by the laser so as to make the part of the peripheral line act as a part of the repair line.

* * * * *